(12) United States Patent
Wilkey

(10) Patent No.: US 8,071,151 B2
(45) Date of Patent: Dec. 6, 2011

(54) DUAL DEPOSIT STENCIL ASSEMBLY

(75) Inventor: Keith E. Wilkey, Chicago, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 2188 days.

(21) Appl. No.: 10/369,363

(22) Filed: Feb. 18, 2003

(65) Prior Publication Data
US 2004/0159248 A1    Aug. 19, 2004

(51) Int. Cl.
*A21D 13/08* (2006.01)
(52) U.S. Cl. .......................................... 426/653; 99/516
(58) Field of Classification Search .................. 426/549, 426/653, 496; 99/359, 345, 360, 444, 516
See application file for complete search history.

(56) References Cited

U.S. PATENT DOCUMENTS

| 2,664,055 | A | * | 12/1953 | Oakes | 222/330 |
| 3,340,824 | A | * | 9/1967 | Talbot | 425/381 |
| 3,840,311 | A | * | 10/1974 | Wight | 425/131.1 |
| 4,469,021 | A | * | 9/1984 | Rose et al. | 99/450.4 |

* cited by examiner

*Primary Examiner* — Kelly Bekker
(74) *Attorney, Agent, or Firm* — Dinsmore & Shohl LLP

(57) ABSTRACT

A dual deposit stencil apparatus for discharging filler materials onto parallel lanes of base cakes comprises a stencil tube having two inlet openings, one communicating with a source of first filler material, and the other communicating with a source of second filler material. The stencil tube has four discharge openings therein. A stencil carried on the stencil tube has pairs of openings therein for receiving two filler materials. Provided in the stencil tube are a first shutoff valve and a second shutoff valve. First and second actuating mechanisms control the shutoff valves and are coordinated to simultaneously provide first and second filler material to each pair of openings in the stencil. A wire mechanism cooperates with the stencil for simultaneously removing the first and second filler materials from each pair of openings.

12 Claims, 6 Drawing Sheets

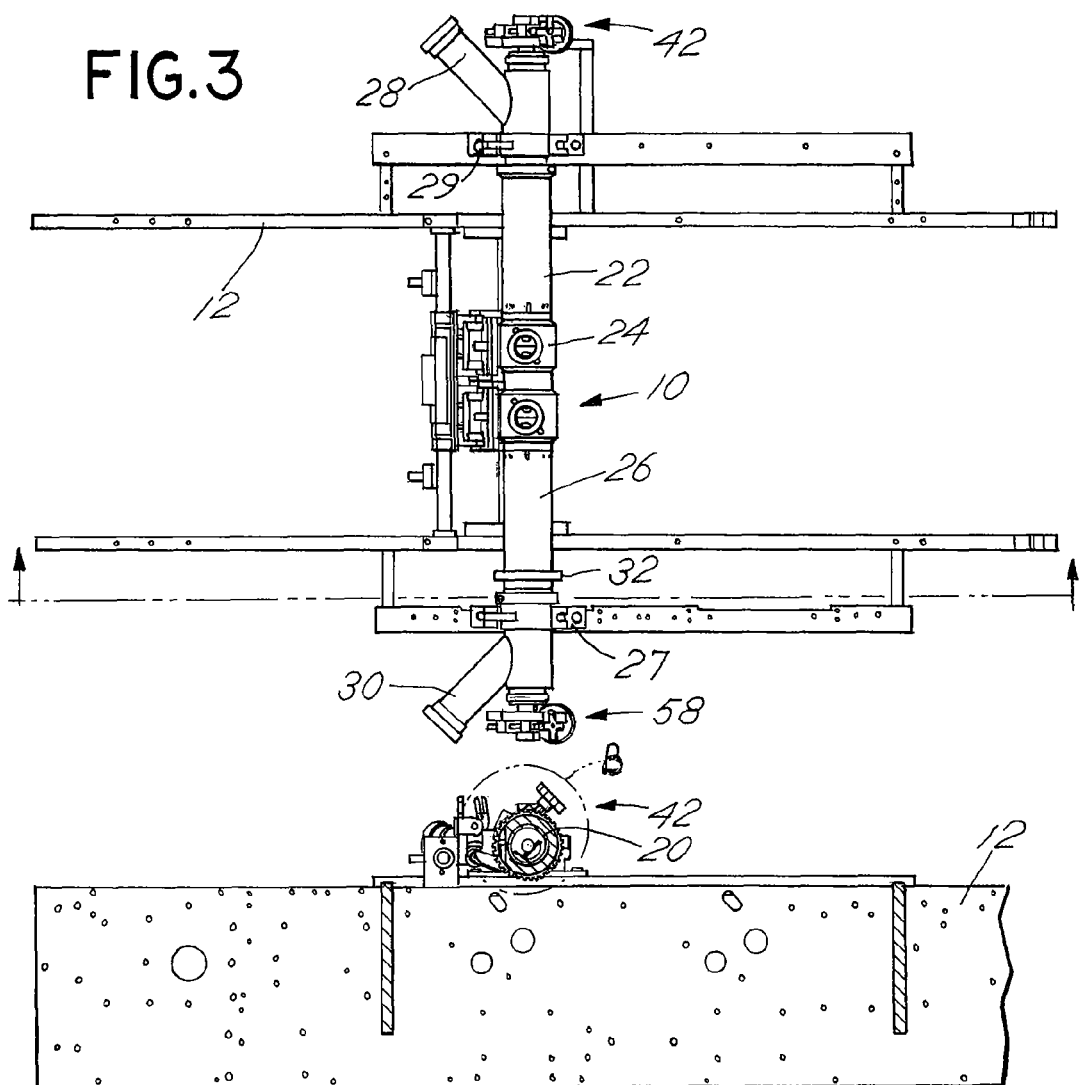

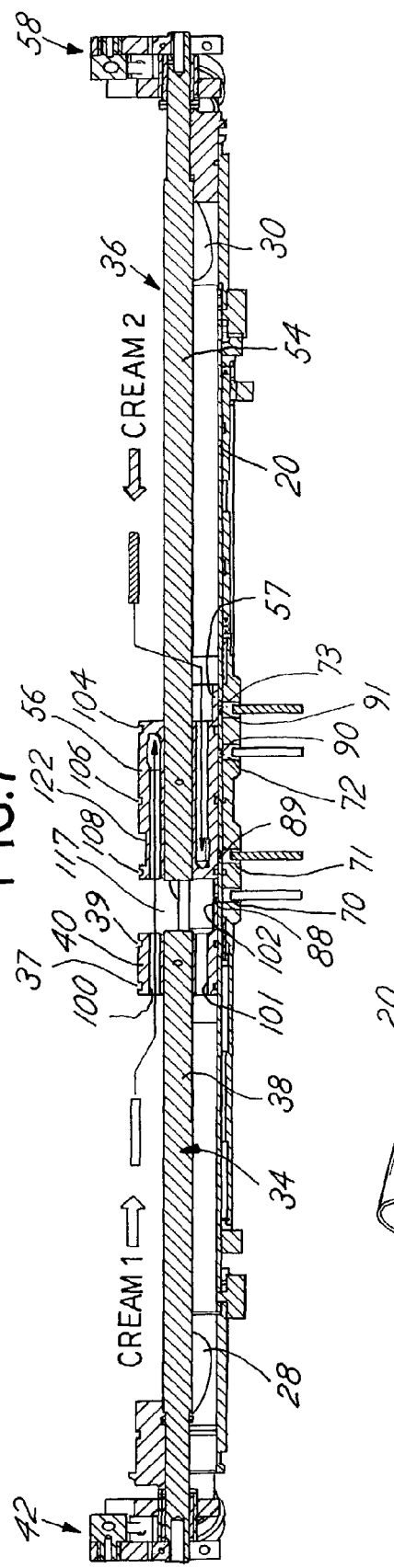
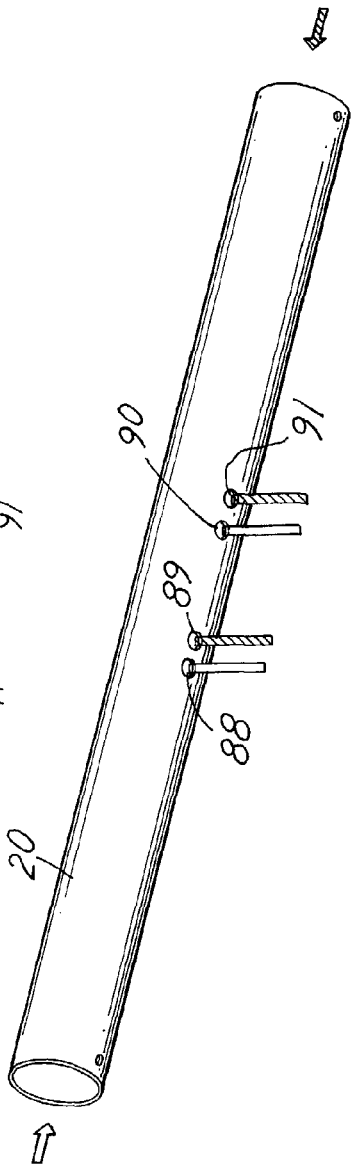
FIG.7
FIG.8

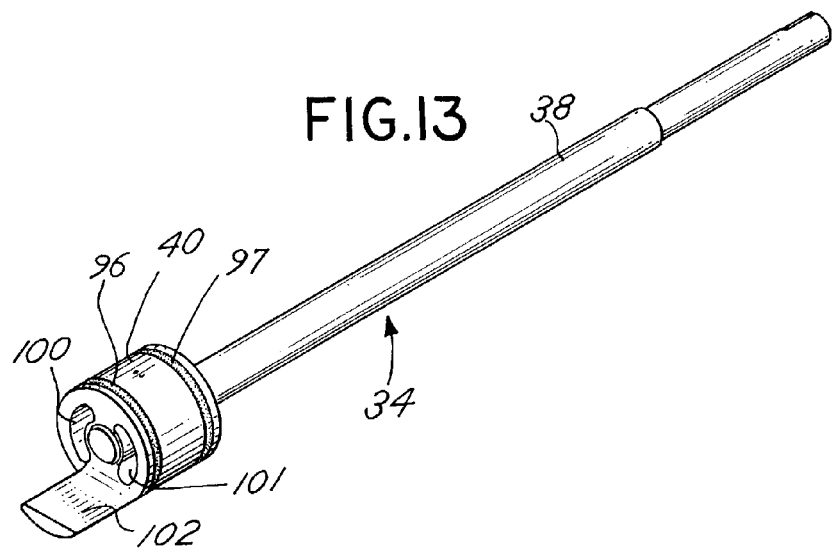
FIG.13
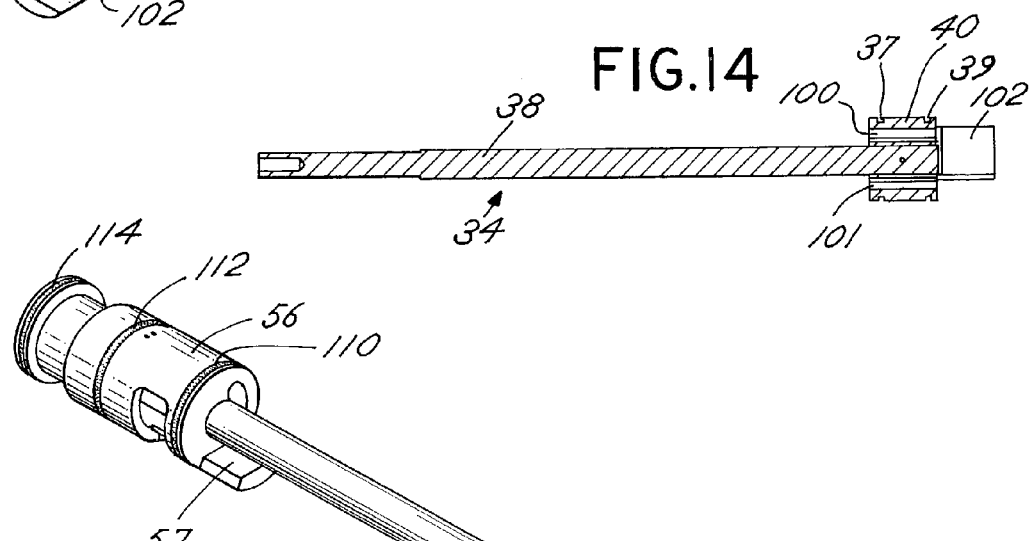
FIG.14
FIG.15
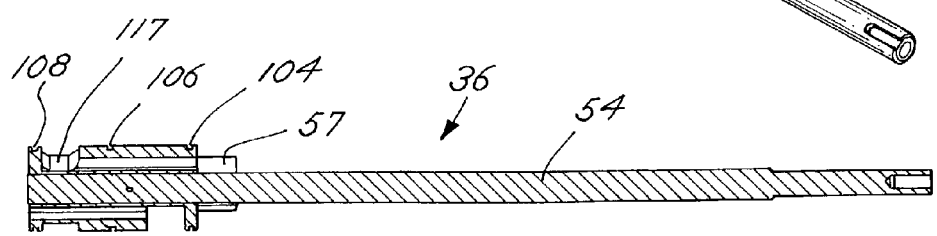
FIG.16

DUAL DEPOSIT STENCIL ASSEMBLY

FIELD OF THE INVENTION

This invention pertains to a dual deposit stencil assembly and, more particularly, to a dual deposit stencil assembly for simultaneously depositing two creams onto a base cake or shell of a confection.

BACKGROUND OF THE INVENTION

There are known apparatus for applying a single cream to a base cake or shell of a confection moving along a longitudinal line in a continuous fashion. For example, see Rose U.S. Pat. No. 4,162,882, wherein a rotating stencil is carried on a stencil tube and the flow of cream from the stencil is controlled by a shut off valve.

When trying to discharge two creams onto a single confection, for example, bake cake or shell, difficulties arose in controlling the flow of the two creams and balancing the flow of the two creams so as to simultaneously apply or deposit the two filler materials, e.g. creams onto a base cake or shell.

An object of the present invention is to provide a dual deposit stencil assembly for simultaneously applying or depositing two filler materials, for example, creams or jellies, or a combination, onto a base cake or a shell.

Another object of the present invention is to provide a dual deposit stencil assembly that incorporates a stencil having dual outlet ports spaced closely adjacent to one another and control means within the stencil assembly for controlling the flow of filler material from a source to a selected outlet port.

Yet another object of the present invention is to provide a dual deposit stencil assembly for simultaneously applying filler materials from separate sources onto a base cake or a shell through a stencil which has inserts for providing a predetermined discharge pattern of the filler materials on the base cake or shell.

Still another object of the present invention is to provide a dual deposit stencil assembly for simultaneously applying filler materials from separate sources onto a base cake or shell in a predetermined manner, with balancing mechanism being provided to balance the flow of the respective filler materials from the stencil.

Other objects and advantages of the present invention will be made more apparent hereinafter.

BRIEF DESCRIPTION OF THE DRAWING

There is shown in the attached drawing a presently preferred embodiment of the present invention, wherein like numerals in the various views refer to like elements and wherein:

FIG. 3 is a plan view of the dual deposit stencil assembly;

FIG. 4 is a cross sectional view of the dual deposit stencil assembly taken generally along the line 4-4 of FIG. 3;

FIG. 5 is an enlarged cross sectional view of the dual deposit stencil assembly of FIG. 4, taken in the circled area 5 in FIG. 4.

FIG. 7 is cross-sectional view of the dual deposit stencil assembly, showing the flow paths for the separate filler materials;

FIG. 8 is a perspective view of the stencil tube;

FIG. 13 is a perspective view of the short shutoff valve;

FIG. 14 is a cross section view of the short shutoff valve of FIG. 13;

FIG. 15 is a perspective view of the long shutoff valve; and

FIG. 16 is a cross section view of the long shutoff valve of FIG. 15.

DETAILED DESCRIPTION OF THE PRESENT INVENTION

Figure 1:
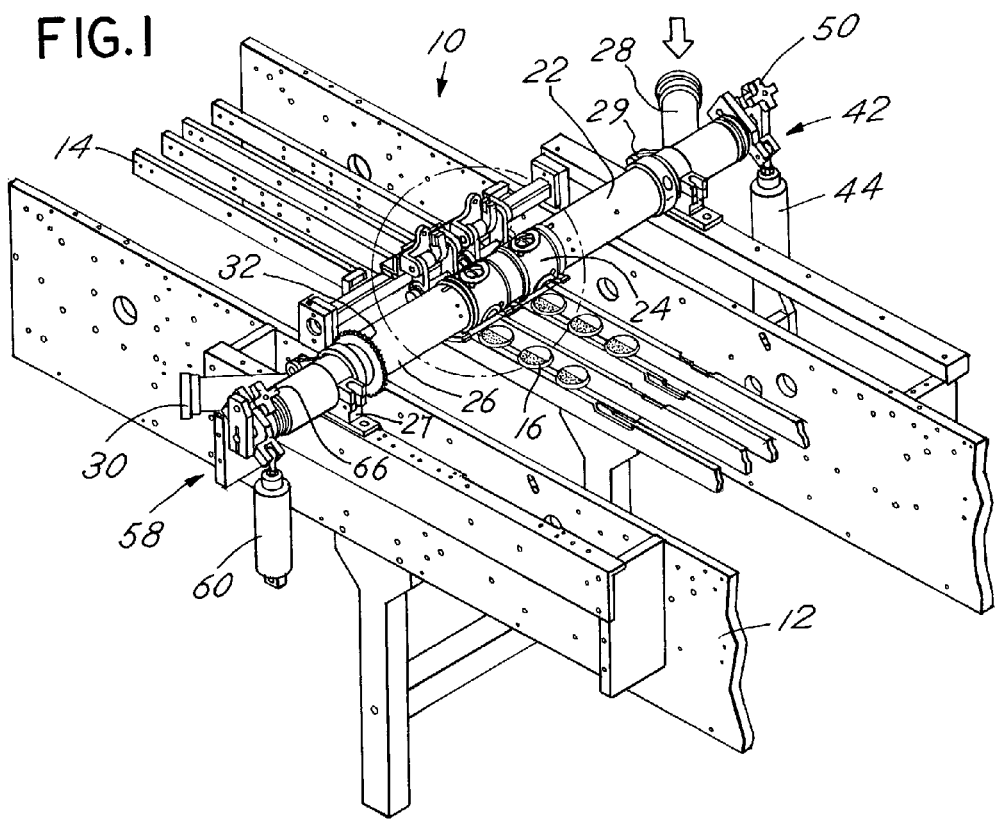
FIG. 1 is a perspective view of the dual deposit stencil assembly of the present invention.
Figure 2:
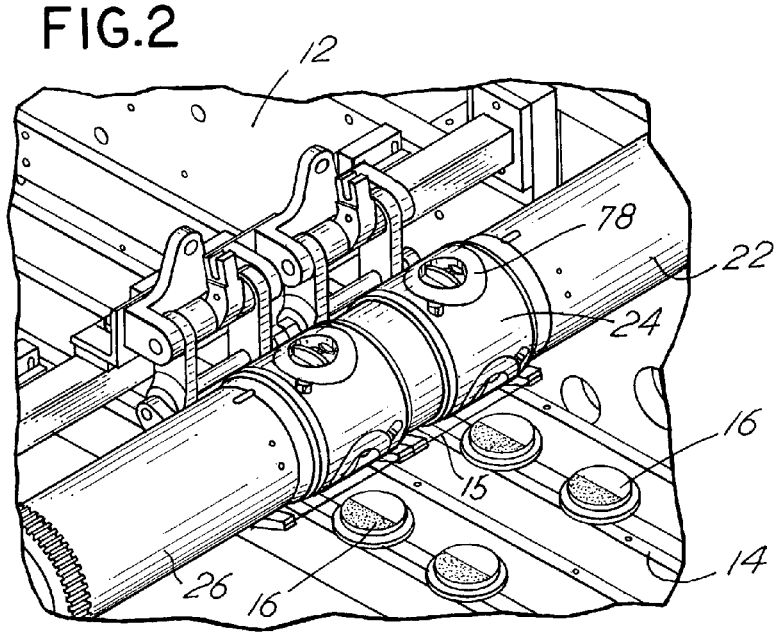
FIG. 2 is an enlarged detail view of the dual deposit stencil assembly of FIG. 11, taken in the circled area A.
Figure 6:
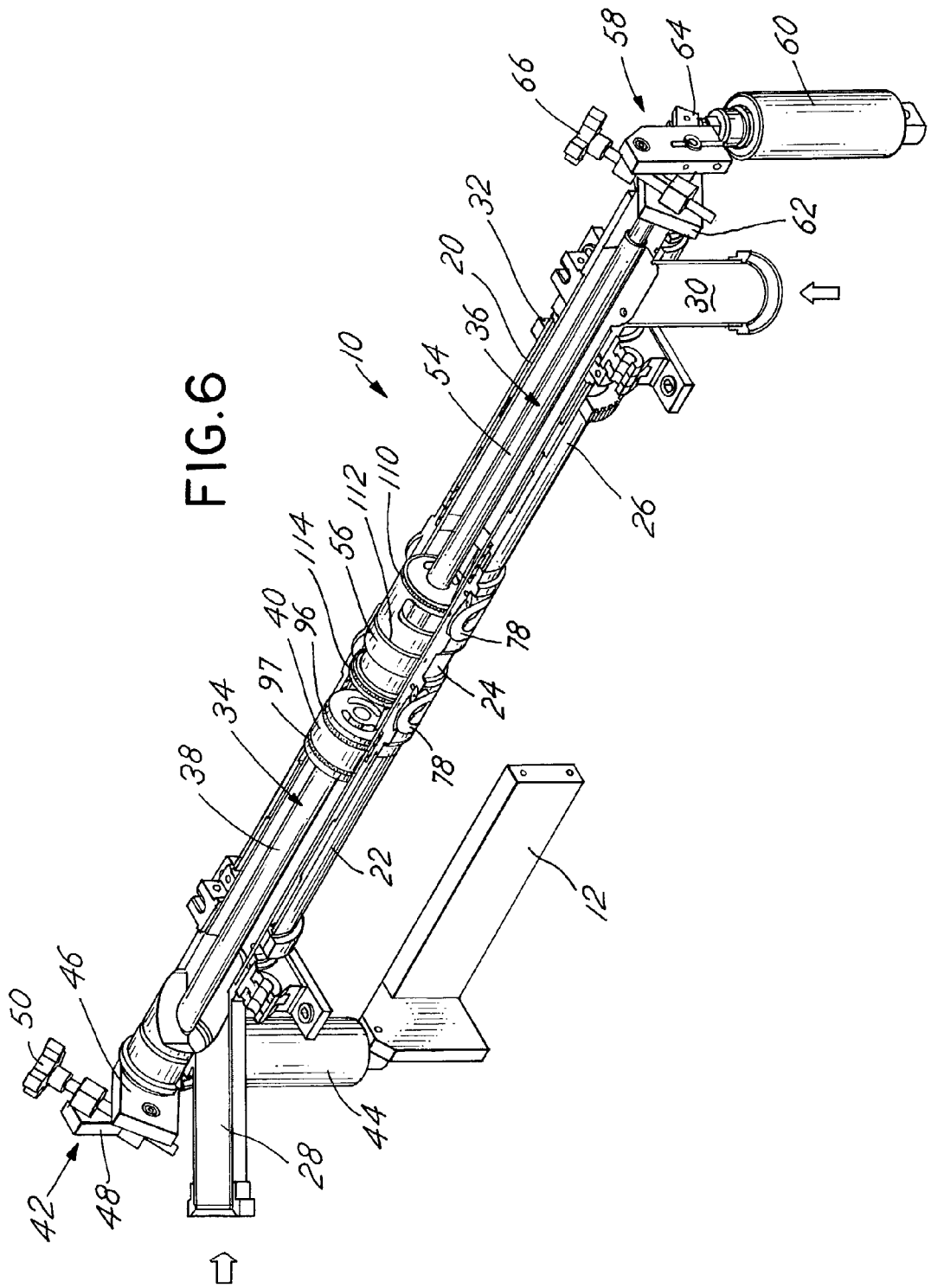
FIG. 6 is a perspective view of the dual deposit stencil assembly, with parts broken away.
Figure 9:
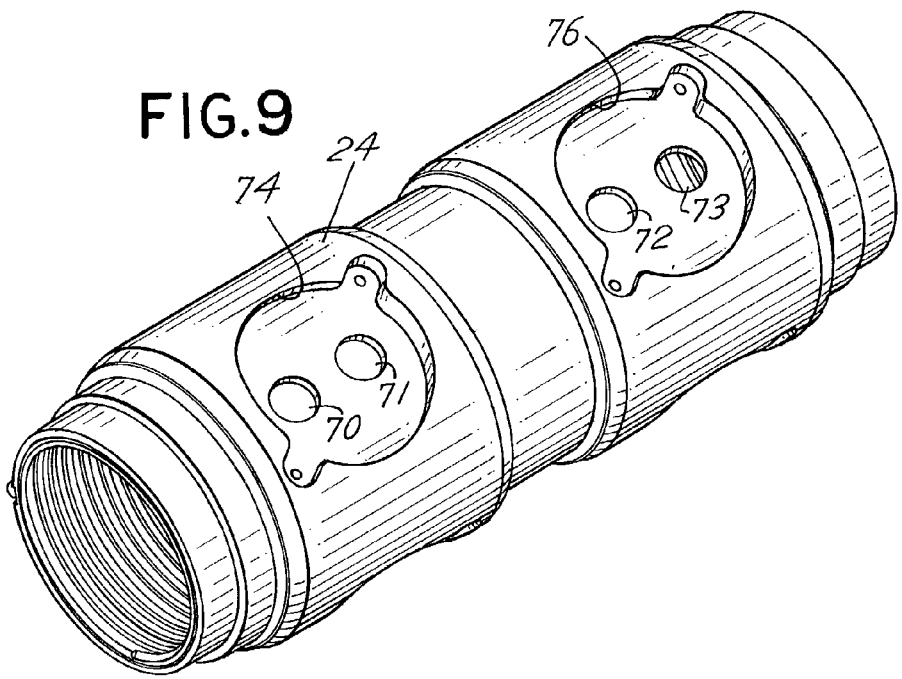
FIG. 9 is a perspective view of the stencil.

Considering first FIGS. 1-6, it is seen that the dual deposit stencil assembly 10 of the present invention is adapted to be mounted on the frame or support 12 of a machine. A conveyor 14 on the frame 12 moves two lanes of cookie base cakes or shells 16 longitudinally beneath the dual deposit stencil mechanism 10. As will be explained hereinafter, two filler materials will be simultaneously formed in inserts 78 in the stencil 24 and cut off by wire mechanism 15 for discharge onto each base cake or shell 16 in a predetermined fashion. The filler materials may be creams, jelly, or the like materials applied to the upper surface of the base cake or shell. Subsequently, another base cake or shell can be applied to the bottom base cake or shell to form a sandwich cookie or biscuit.

The dual deposit stencil assembly 10 includes a stencil tube 20 upon which is carried a first bearing 22, a stencil 24, and a second bearing 26. A first filler material connection 28 communicates with one end of the stencil tube 20 and a second filler material connection 30 communicates with the other end of the stencil tube 20. Each filler material connection 28, 30 is suitably connected to a source of filler material in a conventional fashion. The filler materials entering the respective filler material connections may comprise cremes of different colors or consistencies, or one connection can receive a cream and the other connection can receive a jelly.

It will be apparent to persons skilled in the art that the present invention can satisfy a variety of needs in a cookie making facility wherein it is desired to place two different filler materials on a single base cake or shell.

The bearing 26 carries a gear 32 for rotating the bearing 22, the stencil 24 and the bearing 26 on the stencil tube 20. A suitable drive, for example, an electric motor and gear reducer, (not shown) is operatively connected to the gear 32 for rotating same. If desired, the gear 32 could be a sprocket suitably connected by a chain to a drive. Clamps 27, 29 retain the dual deposit stencil assembly 10 on the frame 12.

Provided in the stencil tube 20 to control the flow of material from the first filler material connection 28 to the stencil 24 is a shutoff valve means 34. Provided in the stencil tube 20 to control the flow of material from the second filler material connection 30 to the stencil 24 is a shutoff valve means 36. The shutoff valve means 34 comprises a shaft 38 having a valve 40 at one end and being operatively connected at the other end to a lever mechanism 42 that is connected to an actuating cylinder 44 for rotating the valve 40 within the stencil tube 20 from a position stopping flow to a position permitting flow. The actuating cylinder 44 may be an air cylinder or a hydraulic cylinder. The lever mechanism 42 includes an idler lever 46, which is connected to the rod extending from the cylinder 44 for rotationally positioning the valve 40 within the stencil tube 20. The cylinder 44 normally moves the valve 40 from a position closing the associated openings in the stencil 24 to a position to permit selected flow from the associated openings in the stencil 24. To fine tune the position of the valve 40 to balance the flow of filler material discharged from the openings in the stencil 24 associated with the valve 40, the lever means include an adjustment lever 48 that is connected to the shaft 38 and a manual thumb screw 50 that is connected between the idler lever 46 and the adjustment lever 48. The cylinder 44 moves the valve 40 to a home position which is nominally a position for balancing the flow of filler material. Adjustment to a precise balance is made by rotating the manual thumb screw 50 to properly position the valve 40 with respect to the openings in the stencil 24.

Similarly, the shutoff valve means 36 comprises a shaft 54 having a valve 56 at one end and being operatively connected at the other end to a lever mechanism 58 that is connected to an actuating cylinder 60 for rotating the valve 56 within the stencil tube 20. The actuating cylinder 60 may be an air cylinder or a hydraulic cylinder. The lever mechanism 58 includes an idler lever 62, which is connected to the rod extending from the cylinder 60 for rotationally positioning the valve 56 within the stencil tube 20. The cylinder 60 normally moves the valve 56 from a position closing the associated openings in the stencil 24 to a position to permit selected flow from the associated openings in the stencil 24. To fine tune the position of the valve 56 to balance the flow of filler material discharged from the openings in the stencil 24 associated with the valve 56, the lever means include an adjustment lever 64 that is connected to the shaft 54 and a manual thumb screw 66 that is connected between the idler lever 62 and the adjustment lever 64. The cylinder 60 moves the valve 56 to a home position which is nominally a position for balancing the flow of filler material. Adjustment to a precise balance is made by rotating the adjustment screw 66 to properly position the valve 56 with respect to the openings in the stencil 24.

The stencil 24 as seen in FIGS. 1, 2, 6, and 9 has pairs of side by side discharge holes or openings 70,71 and 72,73 that terminate in a recess 74,76, respectively, in the stencil 24. The openings 70,71 in the stencil 24 can communicate with the openings 88,89, respectively in the stencil tube 20. The openings 72,73 in the stencil 24 can communicate with the openings 90,91, respectively in the stencil tube 20. Preferably, the recesses are spaced 120□ apart on the circumference of the stencil 24, each recess communicating with pairs of side by side discharge holes. An insert 78 is disposed in each recess. The inserts 78 are constructed and arranged to form a predetermined shape of filler material for deposit onto a bake cake or shell.

With the arrangement shown in FIGS. 9-12, one filler material passes from discharge opening 70 into the opening 80 in the insert 78 and assumes the shape of the opening 78. The second filler material passes from the discharge opening 71 into the opening 82 in the insert 78 and assumes the shape of the opening 82. In this case, the rib 81 is straight and the openings 80, 82 are semi-circular in plan view, and the top of bake cake or shell has the appearance shown in FIG. 12, with one filler material being shown in equally spaced parallel lines 84 and the other filler material being shown in more widely spaced parallel lines 86.

The wire mechanism 15 (FIG. 2) for cutting the filler materials in the inserts 78 in the stencil 24 is basically a wire held at its ends in a support.

From FIG. 8, it is observed that the stencil tube 20, which may be a cylindrical member formed from stainless steel, receives a first filler material or cream at one end and a second filler material or cream at the other end. In the intermediate portion of the stencil tube are pairs of openings 88,89 and 90,91. The openings 88 and 90 communicate with the filler material or cream in feed 1 and the openings 89 and 91 communicate with the filler material or cream in feed 2.

Within the stencil tube 20 are first and second shutoff valve means 34,36 (FIGS. 6, 7 and 13-16) for controlling the discharge of the filler materials from within the stencil tube 20 to the stencil 24. The short shutoff valve means 34 includes a rod 38 and a valve 40. The valve 40 has a pair of spaced recesses 39,37 on the exterior surface thereof receiving O-rings 96,97. Extending through the body of valve 34 are through passages 100,101. Projecting from the body of valve 40 is a shutoff portion 102 for controlling the flow of filler material through opening 73 in stencil tube 20.

The long shutoff valve means 36 includes a shaft 54 and a valve 56. The valve 56 has three recesses 104, 106, 108 for receiving O-rings 110, 112, 114, respectively. Extending through the body of valve 56 are passages 116 and 118. Filler material or cream 2 passes from the inlet connection or cream infeed 28 into the stencil tube 20 through the passage 100 in shut off valve 40 to the chamber 117 for passage to the opening 82 in the left side insert 78, as seen in FIG. 7. The cream 2 then passes to the passage 116, which comprises a bore in the valve 56 that passes the filler material or cream 2 to the hole or opening 82 in the right side insert 78, as seen in FIG. 7. Extending from the body of valve 56 is a shutoff portion 57 for controlling the flow through opening 70 in stencil tube 20. The filler material or cream 1 enters the stencil tube 20 through the cream infeed connection 30 and can flow through the opening 70 in the stencil tube 20 to the opening 80 in the right side insert 78. The cream 1 flows through passage 118 in the valve 56 to the recess 122 formed in the outer surface of the valve 56 and passes through the opening 72 in the stencil tube 20 to the opening 80 in the left side insert 78.

In operation, filler materials, such as creams or jellies are fed from the supply sources to the cream infeeds 28 and 30. Cream from the cream infeed 28 will feed to the openings 73 and 71 in the stencil tube 20. Cream from the cream infeed 30 will feed to the openings 70 and 72 in the stencil tube 20. The flow of material from the opening 70 may be balanced by adjustment of the thumb screw 50. The conveyor for the base cakes or shells 16 is actuated. During rotation of the stencil tube assembly, the dual deposits formed at the insert openings 80,82 in insert 78 will be cut off by the wire mechanism 15 and discharged onto the base cakes or shells 16 on conveyor 14.

Figure 10:
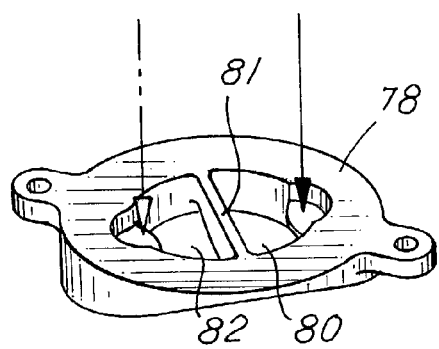
FIG. 10 is a bottom view of the insert.
Figure 11:
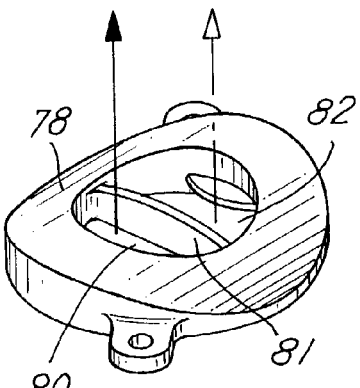
FIG. 11 is a top view of the insert.
Figure 12:
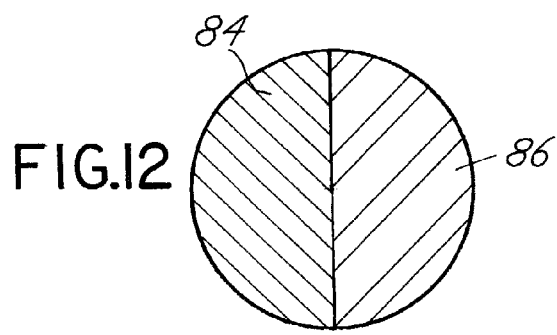
FIG. 12 is a top view of a cookie shell showing the dual deposits of filler material thereon.

As afore noted, the shape of the inserts may be altered to accommodate customer needs, for example the insert rib may be wavy rather than straight, as shown in FIGS. 10 and 11 so as to provide a different pattern of filler materials on the base cake or shell. The materials used for the dual deposit stencil assembly 10 must be food grade material and presently the metal parts are made mostly of stainless steel.

While I have shown a presently preferred embodiment of the present invention, it will be understood that the invention may be otherwise embodied within the scope of the following claims.

I claim:

1. A dual deposit stencil apparatus for discharging filler materials onto cookies comprising a stencil tube having two inlet openings, one communicating with a source of first filler material, and the other communicating with a source of second filler material, said stencil tube having at least a first and a second discharge opening, the first discharge opening communicating with the first filler material and the second discharge opening communicating with the second filler material, bearing means for supporting the stencil tube, a rotary stencil carried on the stencil tube, said rotary stencil having a plurality of third discharge openings and a plurality of fourth discharge openings therein, the third discharge openings of said rotary stencil communicating with the first discharge opening of said stencil tube and the fourth discharge openings of said rotary stencil communicating with the second discharge opening of said stencil tube, a first shutoff valve for controlling the flow of said first filler material to the rotary stencil, a second shutoff valve for controlling the flow of said second filler material to the rotary stencil, first actuating means for controlling the first shutoff valve and second actuating means for controlling the second shutoff valve, the operation of the first and second actuating means being coordinated to simultaneously provide first and second filler material to the third and fourth discharge openings in the stencil, and wire means cooperating with the stencil for simultaneously removing the first and second filler material from the third and fourth discharge openings for discharging same, said third and fourth discharge openings being positioned adjacent each other to permit the discharge of both first and second filler materials simultaneously onto each of said cookies.

2. A dual deposit stencil apparatus as in claim 1, wherein each of the third and fourth openings in the stencil open into a recess in the stencil and an insert is constructed and arranged to be positioned in the recess for controlling the shape of the discharge from the third and fourth openings, said insert defining a rib which extends thereacross for controlling the pattern of the first and second filler materials on each of the cookies.

3. A dual deposit stencil apparatus as in claim 1, wherein the first actuating means includes a cylinder means for rotating the first shutoff valve, the cylinder means being operatively connected by lever means to the first shutoff valve.

4. A dual deposit stencil apparatus as in claim 1, wherein the second actuating means includes a cylinder means for rotating the second shutoff valve, the cylinder means being operatively connected by lever means to the second shutoff valve.

5. A dual deposit stencil apparatus as in claim 1, wherein the first actuating means includes a first cylinder means for rotating the first shutoff valve, the first cylinder means being operatively connected by first lever means to the first shutoff valve and the second actuating means includes a second cylinder means for rotating the second shutoff valve, the second cylinder means being operatively connected by second lever means to the second shutoff valve.

6. A dual deposit stencil apparatus as in claim 5, wherein the first lever means includes adjustment means for adjusting the rotational position of the first shutoff valve about its longitudinal axis to help control the flow of the first filler material discharging from the third discharge openings.

7. A dual deposit stencil apparatus as claim 6, wherein the second lever means includes adjustment means for adjusting the rotational position of the second shutoff valve about its longitudinal axis to help control the flow of the second filler material discharging from the fourth discharge openings.

8. A dual deposit stencil apparatus for discharging filler materials onto cookies moving in two lanes comprising a stencil tube having two inlet openings, one communicating with a source of first filler material, and the other communicating with a source of second filler material, said stencil tube having four discharge openings, bearing means for supporting the stencil tube, a stencil carried on the stencil tube, said stencil having pairs of openings therein, one opening of each pair of openings in said stencil communicating with the source of first filler material and the other opening of each pair of openings in said stencil communicating with the source of second filler material, each of said pair of openings being positioned adjacent each other to permit deposit of two types of filler materials onto a single base cake, a first shutoff valve for controlling the flow of said first filler material to the stencil, a second shutoff valve for controlling the flow of said second filler material to the stencil, first actuating means for controlling the first shutoff valve and second actuating means for controlling the second shutoff valve, the operation of the first and second actuating means being coordinated to simultaneously provide first filler material and second filler material to each pair of openings in the stencil, and wire means cooperating with the stencil for simultaneously removing the first and second filler material from each pair of openings for discharging same, whereby first and second filler material from each pair of openings may be discharged onto the same base cakes.

9. A dual deposit stencil apparatus as in claim 8, wherein each pair of openings in the stencil open into a recess in the stencil and an insert is constructed and arranged to be positioned in the recess for controlling the shape of the discharge from each pair of openings, said insert defining a rib which extends thereacross for controlling the pattern of the first and second filler materials on each of the cakes.

10. The method of providing dual deposits of filler materials on cookie shells comprising the steps of:
  feeding a first filler to a stencil means;
  feeding a second filler to the stencil means;
  discharging the first filler material from a first set of discharge openings in the stencil means, and simultaneously discharging the second filler material from a second set of discharge openings in the stencil means, each of the discharge openings in the first set being positioned adjacent an associated respective one of the discharge openings in the second set;
  removing first filler material from each discharge opening in the first set and simultaneously removing second filler material from the discharge opening in the second set that is adjacent the discharge opening in the first set; and
  simultaneously placing first and second filler material on each cookie shell.

11. The method of providing dual deposits of filler materials on cookie shells according to claim 10, in which the step of simultaneously placing first and second filler material on each cookie shell includes the step of placing first and second filler material on each cookie shell with a straight margin between said first filler material and said second filler material.

12. The method of providing dual deposits of filler materials on cookie shells according to claim 10, in which the step of simultaneously placing first and second filler material on each cookie shell includes the step of placing first and second filler material on each cookie shell with a wavy margin between said first filler material and said second filler material.

* * * * *